United States Patent

Hentzschel

[15] 3,645,785

[45] Feb. 29, 1972

[54] OHMIC CONTACT SYSTEM

[72] Inventor: Hanspeter P. K. Hentzschel, Richardson, Tex.

[73] Assignee: Texas Instruments Incorporated, Dallas, Tex.

[22] Filed: Nov. 12, 1969

[21] Appl. No.: 875,883

[52] U.S. Cl. ....................117/217, 29/612, 117/107, 117/106 A, 317/234 M, 317/235 AP, 317/238, 317/258, 317/261, 338/22 SD

[51] Int. Cl. ....................B44d 1/18

[58] Field of Search ....................317/238, 242, 258, 261, 234 M, 317/235 AP; 29/25.42, 25.35, 573, 589, 612, 621; 117/106, 107, 217, 200, 221, 219, 229; 338/22, 25, 22 SD

[56] References Cited

UNITED STATES PATENTS

| | | | |
|---|---|---|---|
| 3,033,701 | 5/1962 | Wozniak | 117/107 X |
| 3,128,545 | 4/1964 | Cooper | 117/200 X |
| 3,139,361 | 6/1964 | Rasmanis | 117/200 X |
| 3,152,932 | 10/1964 | Matovich | 117/200 X |
| 3,292,062 | 12/1966 | Gallagher et al | 317/258 |

*Primary Examiner*—Alfred L. Leavitt
*Assistant Examiner*—C. K. Weiffenbach
*Attorney*—Harold Levine, Edward J. Connors, Jr., John A. Haug, James P. McAndrews and Gerald B. Epstein

[57] ABSTRACT

An ohmic contact system for a ceramic body having a predetermined relationship between various physical characteristics, such as temperature and resistance, for example, a wafer of semiconducting barium titanate having a positive temperature coefficient of resistance. A film of germanium is deposited on at least one surface of the wafer to protect the surface properties thereof. A layer of a preselected metal which adheres well to germanium and is readily bondable, such as gold, is deposited on the germanium film. A layer of a preselected barrier layer, such as nickel, which functions to prevent the penetration of subsequently applied process materials, such as solder, which might adversely affect the underlying gold layer, is deposited on the gold layer. An exterior layer of a readily solderable material which adheres well to the underlying nickel layer, such as gold, is deposited on the nickel layer. An external electrical conductor may then be readily soldered to the external gold layer to provide a good ohmic and mechanical contact to the wafer. An additional base layer of a preselected material, such as palladium, which adheres well to nickel and to gold may be deposited intermediate the nickel layer and the exterior gold layer to provide an improved base for the external gold layer.

16 Claims, 2 Drawing Figures

PATENTED FEB 29 1972 3,645,785

Figure 1:
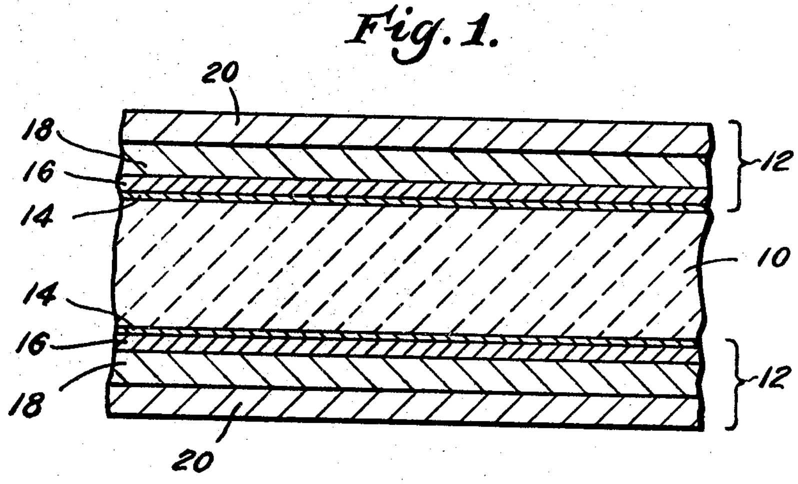

Inventor,
Hanspeter Paul Karl Hentzschel,
by Gerald B. Epstein Att'y.

OHMIC CONTACT SYSTEM

The present invention relates generally to contact systems and more particularly is directed to ohmic contact system for effecting a high mechanical strength, low resistance ohmic contact to a surface of a ceramic body.

In recent years numerous materials have been discovered and utilized which have particular relationships between characteristics, such as environmental temperature and resistance. More particularly, such materials may have a definite and predictable resistance value at various temperature levels and are useful in a number of different applications, such as current limiters, temperature indicators, temperature sensors, etc., and may be utilized as motor protectors, temperature maintaining devices in self-regulating ovens, etc. One example of such a material is semiconducting polycrystalline barium titanate, which has a positive temperature coefficient of resistance. Such a material is extremely useful in numerous applications where a predetermined relationship between resistance and environmental temperature is required.

However, in order to successfully utilize material of this nature in most applications, it is necessary to connect the device in an electrical circuit which in turn requires the provision of suitable high mechanical strength low resistance ohmic contacts on the surfaces of the material. This type of material presents a number of difficulties in this regard. Initially, the problem of making a ceramic-metal junction which is mechanically strong and has a low resistance arises. Further, various process steps utilized in fabricating the contact system, such as the application of heat, may adversely affect the temperature-resistance characteristics of the material. For example, it is currently theorized that the temperature-resistance characteristics of semiconducting barium titanate thermistors is attributable at least in part, to an atomic film of chemisorbed oxygen at the surfaces of the grain boundary of the wafer. The application of heat such as produced by soldering, or certain deposition procedures, may disturb this film and thus, destroy the desired material characteristics.

Generally, it has been found that attempts to form direct solder contacts at a surface of a material of this type does not produce suitable ohmic contacts, since only a mechanical bond is formed with a very high junction resistance. Various ultrasonic soldering techniques have been attempted to provide such a contact system which is mechanically strong but yet avoids a high resistance junction between the contact material and the ceramic, but such methods have not been entirely successful, since the resultant contact often suffers mechanical weaknesses and may be prone to failure during subsequent heat cycling tests. In addition, various metallic depositions have been utilized, but certain problems have arisen particularly in view of the presence of the sensitive film of chemisorbed oxygen at the grain boundary of the material, since the film may adversely react with the material being deposited or with various of the substances produced by the deposition reaction.

Accordingly, it is an object of the present invention to provide an improved ohmic contact system for a ceramic body having a predetermined relationship between several physical characteristics.

It is another object of the present invention to provide a mechanically strong, low resistance ohmic contact to at least one surface of a wafer of semiconducting barium titanate having a positive temperature coefficient of resistance.

It is another object of the present invention to provide an improved ohmic contact system at opposed generally parallel surfaces of a wafer of semiconducting barium titanate, having a positive temperature coefficient of resistance which contact system affords protection of the surfaces of the wafer, is mechanically strong, and forms a low resistance junction between the wafer surfaces and the contact system.

It is still another object of the present invention to provide an improved ohmic contact system sec$red to opposed parallel surfaces of a wafer of semiconducting barium titanate, having a positive temperature coefficient of resistance which contact system is in the form of metallic laminate secured to opposed parallel surfaces of the wafer through an intermediary protective film bonded to the surfaces of the wafer.

It is a further object of the present invention to provide an improved ohmic contact system secured to opposed parallel surfaces of a wafer of semiconducting barium titanate, having a positive temperature coefficient of resistance, which ohmic contact system may be conveniently and inexpensively fabricated forms a high-strength mechanical bond with the wafer surfaces, is extremely durable, and has an exterior exposed surface which may be readily soldered to an external electrical conductor.

Figure 2:
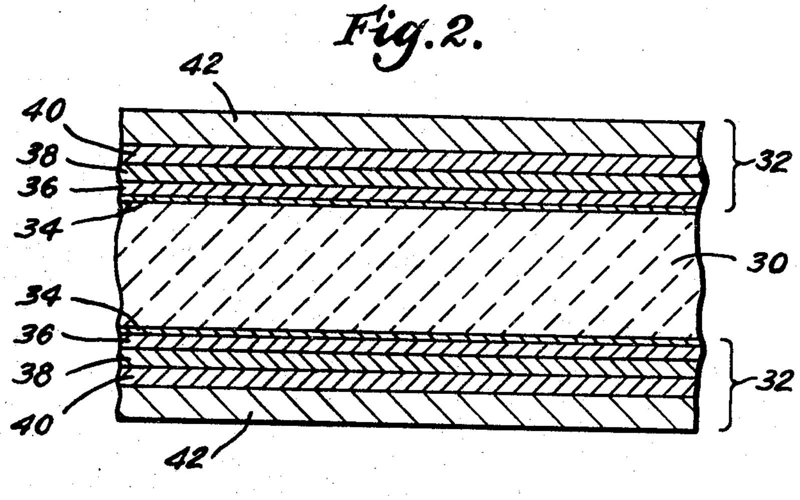

Various additional objects and advantages of the present invention will become readily apparent from the following detailed description and accompanying drawings wherein:

FIG. 1 is a vertical sectional view illustrating one embodiment of the present invention; and FIG. 2 is a vertical sectional view illustrating an alternative embodiment of the present invention.

Very generally, referring to the drawings and particularly to FIG. 1, a ceramic body 10, preferably comprising a semiconducting barium titanate wafer is illustrated, having an ohmic contact system 12 arranged at opposed parallel surfaces. The wafer 10 may have virtually any desired shape and may be of a desired thickness to provide a preselected temperature resistance characteristic, depending upon the ultimate intended use of the device. The contact system 12 is preferably arranged in the form of a metallic laminate secured to the opposed parallel surfaces of the wafer 10 in order to provide an exposed external surface, which is readily solderable to an external electrical conductor (not shown).

As previously mentioned, it is believed that the predetermined relationship between temperature and resistance of a suitably treated semiconducting barium titanate wafer is at least in part attributable to the presence of a thin atomic film of chemisorbed oxygen at the grain boundary thereof. In order to provide protection for this film and to preserve the desired temperature-resistance relationship, a preselected protective layer 14 is deposited on opposed surfaces of the wafer 10 in the illustrated embodiment. This protective layer 14 preferably comprises a coating of germanium which has been found to provide an extremely high degree of adherence to the underlying surface without disturbing the temperature-resistance characteristics of the wafer. However, germanium is a relatively unstable material, and it is desirable to provide means for preventing deterioration of the germanium layer by the provision of a suitable material which protects the germanium as well as furnishing a readily adherent surface having good electrical conducting properties to facilitate the completion of the contact system. Thus, a layer 16 of a preselected metal, such as gold, is deposited upon the germanium layer in order to accomplish these objectives.

Although it is possible to make a solder contact directly to the gold layer 16, which directly overlies the germanium coating, such a procedure could give rise to difficulties. In certain instances, the soldering operation could cause sufficient melting of the gold to permit portions of the solder to penetrate through the gold layer and adversely react with the underlying germanium layer causing loss of adhesion between the gold and the germanium, adverse reactions at the germanium-wafer interface, etc. Accordingly, a protective barrier layer 18 is deposited overlying the gold layer 16 to protect the gold layer 16 against undesired reactions with subsequently used solder material. Preferably, the layer 18 comprises a layer of nickel which has been found to function extremely well as a barrier layer. Since it is desirable that the nickel layer 18 be substantially free of pinholes, an electroless nickel plating operation for the nickel deposition may be advantageous in certain instances. However, an electroless plating operation results in the production of hydrogen atoms which may adversely affect the chemisorbed oxide coating in the barium titanate wafer and accordingly, extreme care must be exercised during the course of such an operation. In order to avoid these problems, it has been found preferable to utilize an electroplating technique or an evaporation technique for depositing the nickel layer 18.

Since nickel is a relatively difficult material to wet utilizing certain common solder materials, it is desirable to provide an exterior layer 20 of a material which adheres well to nickel and which is readily solderable in order to alleviate such difficulties. In this connection, an exterior layer 20 preferably comprising gold is deposited on the nickel layer to complete the ohmic contact system. As a result of providing the exterior gold layer 20, it is possible to utilize readily available inexpensive lead-tin solder compositions which readily spread over the entire surface and a rosin flux or no flux solder may be employed. An additional advantage of utilizing a lead-tin solder material resides in the relatively low temperatures, which are necessary, preferably less than 200° C. so as to obviate any possibility of damage to the heat-sensitive wafer material.

The wafer 10 of semiconducting barium titanate as previously explained, may be formed in virtually any desired configuration, such as a circular shape, a rectangular shape, etc., depending upon the ultimate disposition of the material. Preferably, the wafer has a resistance which increases with temperature and is commonly referred to as semiconducting barium titanate having a positive temperature coefficient of resistance. The properties of such a material are readily ascertainable and this type of material may be conveniently produced having the requisite characteristics for the use intended, such as a desired anomaly point, slope of the temperature-resistance curve, etc.

Preferably, a semiconducting barium titanate structure is utilized which is doped with a rare earth element such as lanthanum or a material, such as antimony. Typically, such a material may be doped with approximately 0.2 to 0.4 mole percent lanthanum, and is commonly referred to as semiconducting lanthanide-doped barium titanate having a positive temperature coefficient of resistance.

In one typical example of an ohmic contact system, such as shown in FIG. 1 the various layers of material are formed utilizing conventional evaporation techniques in a suitable evacuated enclosure. Initially, a layer of germanium having a thickness of approximately between 10 and 500 A. is evaporated on the opposed surfaces of a semiconducting barium titanate wafer to form an initial adhesion layer after the surfaces of the wafer have been subjected to a glow discharge cleaning procedure to assure the absence of any impurities on the surface, such as absorbed water. Layers of gold of between approximately 1,000 and 10,000 A. in a thickness are evaporated on the germanium coating to protect the coating and to improve the conductivity of the system. The layers of nickel are then electroplated or evaporated on the exposed surfaces of the gold layers to a thickness of between approximately 1,000 and 10,000 A. The final exterior layers of gold are deposited on the nickel by evaporation, electroplating, or electroless plating techniques and also have a thickness of between approximately 1,000 and 10,000 A.

Referring now to FIG. 2 which illustrates another embodiment of the present invention, a semiconducting barium titanate wafer 30 is shown having a predetermined relationship between temperature and resistance. Preferably, the wafer 30 has a positive temperature coefficient of resistance similar to the wafer 10 illustrated in FIG. 1 and has a pair of opposed generally parallel surfaces. An ohmic contact system 32 somewhat similar to the ohmic contact system 12 is provided but differing therefrom in several important respects.

The ohmic contact system 32 includes a relatively thin coating 34 of germanium disposed on the opposed parallel surfaces of the wafer 30 in order to provide protection against deterioration of the surface properties of the wafer. More particularly, the germanium coating protects the atomic film of chemisorbed oxygen at the grain boundary of the wafer to which the temperature-resistance properties are believed to be at least in part attributable, as previously explained. Protection for the relatively unstable germanium coating is in turn provided by layers 36 of gold which are deposited on the exposed germanium surfaces in order to protect the germanium against oxidation, as well as to provide a bonding surface and increase the electrical conductivity of the contact system. Gold is a particularly desirable material in view of its ready adherence to germanium as well as its excellent bondability to other metallic materials.

Although it may be possible in certain instances to solder an external conductor directly to the gold layer 36, such a procedure may present substantial difficulties in view of the fact that the gold is susceptible to alloying and melting during soldering, which may permit the solder to penetrate the gold layer to the underlying germanium resulting in deterioration of the germanium as well as possible undercutting of the gold layer. Accordingly, a poor solder contact could result as well as possible disturbance of the properties of the underlying wafer surface. Thus, to provide increased protection against any adverse effects of this nature a protective barrier layer 38 which presents a diffusion barrier to solder is provided. Preferably, this barrier layer comprises a material such as nickel, which functions as an effective barrier without disturbing the conductivity properties of the contact system.

However, certain problems arise in depositing a nickel layer as a barrier or protective layer. More particularly, nickel is somewhat susceptible to the presence of pores or pinholes which could permit materials such as solder to penetrate to the underlying layer being protected, as previously explained. Although the utilization of an electroless deposition procedure for depositing the nickel layer on the gold layer, may avoid such difficulties, as explained above, such a procedure may result in other difficulties since the electroless plating procedure produces hydrogen atoms, which in certain instances may adversely affect the chemisorbed oxygen film on the surfaces of the wafer 30. Accordingly, in order to provide an additional measure of protection, while avoiding the problem of pinholes in the nickel layer an additional protective base layer 40 is preferably deposited on the exposed surfaces of the nickel layers 38. The layers 40 preferably comprise material, such as palladium, which readily seals any pinholes or pores in the nickel layer and thereby obviates any problem of solder penetration through the nickel layer. In addition, the palladium layer presents an excellent base layer on which a final exterior layer 42 may be deposited. The final or terminal exterior layer 42 preferably comprises a material, which is readily bondable and adheres well to the palladium base layer, and also has the property of being readily wetted by various solder compositions so that a solder contact may be readily made. A preferred material for use as the final exterior layer 42 comprises gold. This final exterior gold layer 42 serves to protect the contact system 32 against adverse oxidation effects, as well as providing a convenient bonding surface which aides in spreading solder over the entire gold coated surface to assure an excellent mechanical and electrical connection.

The above described contact system provides an extremely advantageous arrangement in that it provides a contact system having a high degree of mechanical strength, while avoiding an high resistance junctions between the wafer and the metallic laminate comprising the contact system, and at the same time protects and preserves the surface properties of the wafer so as to maintain the desired temperature resistance characteristics.

As an example of the extremely high degree of mechanical strength which results from utilizing an arrangement such as that described above, Table 1 set forth below compares the tensile strengths of various techniques and materials utilized for providing ohmic contacts to a semiconducting barium titanate wafer and clearly indicates the superiority of the contact system in accordance with the present invention which provides a system having an average tensile strength several times greater than the prior art systems tested. In addition, Table 2 presented below compares the average resistance of a number of different contact systems compared with the present contact system and again illustrates the clear superiority of a contact system in accordance with the present invention in view of the significantly lower ohmic resistance which results.

TABLE 1

Comparison of the Mechanical Strength of Various Ohmic Contact systems on Semiconducting Barium Titanate Wafers.

| Contact Material | Solder Composition | Average Tensile Strength in lb./in.² |
|---|---|---|
| Ultrasonic Soldering Directly to Wafer Surface | 75% Tin, 12.5% Indium, and 12.5% Silver | 1,500 |
| Ultrasonic Soldering Directly to Wafer Surface | 80% Gold and 20% Tin | 1,500 |
| Ultrasonic Soldering Directly to Wafer Surface | 10% Silver and 80% Lead, 10% Indium | 1,000 |
| Electroless Plated Nickel | 60% Lead and 40% Tin | 600 |
| Fired Silver | 60% Lead and 40% Tin | 300 |
| Metallic Laminate Described in Connection with FIG. 2 of the Present Invention | Pure Tin | 5,000 |

TABLE 2

Comparison of the Resistance Value of Various Ohmic Contact Systems on Semiconducting Barium Titanate Wafers

| Contact Material | Average Resistance Value in Ohms |
|---|---|
| Ultrasonic Solder Directly to Wafer Surface (75% Tin, 12.5% Indium, and 12.5% Silver) | 292 |
| Electroless Plated Nickel | 222 |
| Fired Silver | 20,000 |
| Gold | 1,280 |
| Metallic Laminate Described in Connection With FIG. 2 of the Present Invention | 140 |

In accordance with one example of a method of fabricating a device such as illustrated in FIG. 2 a wafer of semiconducting barium titanate is initially provided and its opposed surfaces are suitably lapped in order to achieve a desired thickness of between approximately 0.043 inch and 0.047 inch. Generally, a starting wafer is utilized which is substantially larger in area than the desired devices with the large area wafer being subsequently diced into devices of the desired size, after completion of the contact system. The surfaces of the wafer are initially cleaned in an argon atmosphere utilizing an argon glow discharge process for a period of approximately 10 minutes in order to remove any undesired impurities and particularly any impurities such as absorbed surface water. The wafer 30 is then subjected to a vacuum deposition procedure in order to deposit the coatings of germanium 34 on the opposed wafer surfaces. The germanium coatings have a thickness of between approximately 90 A. and 110 A. and preferably a thickness of 100 A. The gold layers 36 are then deposited in a similar vacuum deposition procedure and layers having a thickness of between approximately 1,500 A. and 1,700 A. and preferably 1,600 A. are deposited.

The evacuated system in which these deposition steps have been effected is then opened and the carrier or boat which supports the wafer and the previously formed layers of material is changed in order to remove undesired impurities. The surfaces of the wafer are then subjected to an additional cleaning operation by disposing the device in an argon atmosphere with an argon glow discharge for a time interval of approximately 10 minutes.

The layers of nickel 38 are then deposited on the previously formed gold layer, utilizing a similar vacuum deposition procedure. The thickness of the nickel layers is between approximately 1,900 A. and 2,100 A. and preferably 2,000 A. The layers 40 of palladium are then deposited on the nickel layers in order to seal any pores or pinholes in the nickel. The palladium is deposited to a thickness of between approximately 2,100 A. and 2,300 A. and preferably a thickness of 2,200 A. The final exterior layer of gold 42 is then deposited on the palladium and is preferably deposited in a thickness of between approximately 5,900 and 6,100 A. and preferably a thickness of 6,000 A. The contact system is then ready for the application of a suitable solder so that connection may be made with an external electrical conductor (not shown). Preferably, a pure tin solder is utilized and applied at a temperature of approximately 250° C. in conjunction with a nonactive rosin flux.

Upon completion of the ohmic contact system on the wafer 30 in the manner above described, the wafer and the associated contact system is appropriately diced into a plurality of individual units utilizing a cavitron. The individual units are then ready to be tested and/or connected to electrical conductors for use.

Thus, a unique ohmic contact system has been described for application to a semiconducting barium titanate crystal having a predetermined relationship between temperature and resistance, the ohmic contact system being such as to preserve and protect the desired temperature-resistance characteristics of the wafer, while being mechanically strong and providing a relatively low resistance junction, and being readily solderable to an external electrical conductor.

Various additional changes and modifications in the above described system and process for fabrication thereof will be readily apparent to one skilled in the art and such changes and modifications are deemed to be within the spirit and scope of the present invention as set forth in the following appended claims.

What is claimed is:

1. In combination with a semiconducting barium titanate wafer having a positive temperature coefficient of resistance, said wafer being doped with approximately 0.2 to 0.4 mole percent of an element selected from the class consisting of lanthanum and antimony and having a pair of opposed generally parallel surfaces, an ohmic contact system comprising layers of germanium disposed on said opposed surfaces, an atomic surface film of chemisorbed oxygen on said pair of surfaces underlying said germanium layers, inner layers of gold disposed on said germanium layers, layers of nickel disposed on said gold layers, layers of palladium disposed on said nickel layers, and outer layers of gold disposed on said palladium layers, thereby defining a solderable exterior surface adapted to form a high mechanical strength ohmic contact with an external electrical conductor.

2. An ohmic contact system for a ceramic body, exhibiting a predetermined relationship between sensed temperature and resistance, comprising a coating of germanium on at least one surface of the ceramic body to protect said surface, said germanium coating being in electrical contact with said surface, and a metallic laminate disposed on said germanium coating to protect said germanium coating against deterioration and to provide a bondable contact surface to which an electrical conductor may be mechanically secured in ohmic contact with said surface of the body, said laminate including a layer of gold in contact with and overlying said germanium coating, an exterior layer of gold adapted to provide an exposed contact, and an intermediate barrier layer of nickel disposed between said gold layers.

3. An ohmic contact system in accordance with claim 1 wherein said metallic laminate includes an additional protective barrier layer comprising palladium disposed intermediate said nickel layer and said exterior gold layer.

4. An ohmic contact system in accordance with claim 1 wherein germanium coatings are disposed on a pair of opposed surfaces of the ceramic body in electrical contact with the surfaces and said metallic laminate is bonded to said germanium coatings.

5. An ohmic contact system for a wafer of semiconducting barium titanate having a positive temperature coefficient of resistance and having a pair of generally parallel surfaces comprising a metallic laminate including inner and outer layers comprising gold and an intermediate barrier layer comprising nickel to prevent penetration of solder material from said outer layer to said inner layer, and a protective coating of germanium disposed intermediate at least one of said surfaces of the wafer and said inner layer of said laminate, said germanium coating bonding bonding said laminate to said surface of said wafer.

6. An ohmic contact system in accordance with claim 5 wherein said coating of germanium has a thickness of between approximately 10 A. to 500 A., said inner and outer layers each have a thickness of between approximately 1,000 A. to 10,000 A., and said intermediate barrier layer has a thickness of between approximately 1,000 A. to 10,000 A.

7. An ohmic contact system in accordance with claim 5 wherein said germanium coating and said metallic laminate are arranged on both of said opposed surfaces of said wafer.

8. An ohmic contact system for a wafer of semiconducting lathanide-doped barium titanate having a positive temperature coefficient of resistance, and having a pair of generally parallel opposed surfaces, said contact system comprising a protective coating of germanium disposed on each of said opposed surfaces and in electrical contact therewith for maintaining the surface properties of the wafer, an inner layer comprising gold disposed on each of said germanium coatings, a metal barrier layer comprising nickel disposed on said inner gold layers, a base layer comprising palladium disposed on said nickel barrier layers, and an outer layer comprising gold disposed on said palladium base layers, thereby providing bonding surfaces for receiving securement of electrical conductors thereto forming high-strength ohmic contacts with said wafer.

9. An ohmic contact system in accordance with claim 8 wherein said germanium layers have a thickness of between approximately 90 A. to 110, said inner gold layers have a thickness of between approximately 1,500 A. and 1,700 A., said nickel layers have a thickness of between 1,900 A. and 2,100 A., said palladium layers have a thickness of between approximately 2,100 A. and 2,300 A., and said outer gold layers have a thickness of between approximately 5,900 A. and 6,100 A.

10. An ohmic contact system in accordance with claim 9 wherein an atomic film of chemisorbed oxygen is present at the grain boundary of opposed wafer surfaces underlying said germanium coatings.

11. An ohmic contact system in accordance with claim 9 wherein said wafer comprises barium titanate doped with approximately 0.2 to 0.4 mole percent lanthanum and has a thickness of between approximately 0.043 inch and 0.047 inch.

12. A process for forming an ohmic contact system on a wafer of semiconducting barium titanate having a positive temperature coefficient of resistance comprising vacuum depositing an initial adhesion layer of germanium directly onto at least one surface of said wafer in electrical contact with the surface to preserve the surface properties thereof, depositing an inner layer comprising gold on said germanium layer to form a bondable surface and to protect said germanium layer against oxidation, depositing a barrier layer comprising nickel on said gold layer to prevent penetration of impurities onto said inner layer, and depositing a final exterior layer comprising gold on said barrier layer to form a bonding surface to which an external electrical conductor may be mechanically secured in ohmic contact with said wafer.

13. A process in accordance with claim 12 wherein said layers of gold and nickel are vacuum deposited on a pair of opposed parallel surfaces of said wafer and the surfaces of the wafer are cleaned in an argon atmosphere with an argon glow discharge for a time interval of approximately 10 minutes prior to deposition of said germanium layer.

14. A process for forming an ohmic contact system on opposed generally parallel surfaces of a wafer of semiconducting lanthanide-doped barium titanate comprising vacuum depositing layers of germanium on said opposed surfaces overlying a film of chemisorbed oxygen on said surfaces, depositing layers of gold on said germanium layers to protect said germanium layers and improve the conductivity of the contact system, depositing barrier layers comprising nickel on said gold layers to provide protection against the adverse effects of subsequently utilized process materials, and depositing final layers of gold on said barrier layers to provide an external bonding surface.

15. A process in accordance with claim 14 wherein said layers of gold and nickel are vacuum deposited and an additional barrier layer comprising palladium is deposited subsequent to deposition of said nickel layer and overlying said nickel layer.

16. A process in accordance with claim 15 wherein said opposed surfaces are subjected to a cleaning process by disposition in an argon atmosphere with a glow discharge for a time interval of approximately 10 minutes prior to the deposition of said germanium layer and prior to the deposition of said nickel layer.

* * * * *